US012579252B2

(12) United States Patent
Zhou et al.

(10) Patent No.: US 12,579,252 B2
(45) Date of Patent: *Mar. 17, 2026

(54) DATA PROCESSING METHOD AND APPARATUS

(71) Applicant: Hangzhou AliCloud Feitian Information Technology Co., Ltd., Hangzhou (CN)

(72) Inventors: Hao Zhou, Hangzhou (CN); Wei-Tso Chen, Hangzhou (CN); Fei Shi, Hangzhou (CN); Kan Dong, Hangzhou (CN)

(73) Assignee: Hangzhou AliCloud Feitian Information Technology Co., Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/702,307

(22) PCT Filed: Feb. 2, 2023

(86) PCT No.: PCT/CN2023/074217
§ 371 (c)(1),
(2) Date: Apr. 17, 2024

(87) PCT Pub. No.: WO2023/155686
PCT Pub. Date: Aug. 24, 2023

(65) Prior Publication Data
US 2025/0124123 A1     Apr. 17, 2025

(30) Foreign Application Priority Data

Feb. 15, 2022     (CN) .......................... 202210139166.6

(51) Int. Cl.
*G06F 21/53*          (2013.01)

(52) U.S. Cl.
CPC ................................... *G06F 21/53* (2013.01)

(58) Field of Classification Search
CPC .... G06F 21/53; G06F 21/575; G06F 9/44521; G06F 21/74
See application file for complete search history.

(56) References Cited

U.S. PATENT DOCUMENTS 7,856,637 B1     12/2010   Clark
2002/0199172 A1     12/2002   Bunnell
(Continued)

FOREIGN PATENT DOCUMENTS

CN          101984409 A          3/2011
CN          105427096 A          3/2016
(Continued)

OTHER PUBLICATIONS

Notification to Grant Patent Right for Invention issued Jul. 4, 2024, in Chinese Application No. 2202210139166.6.
(Continued)

*Primary Examiner* — Beemnet W Dada
(74) *Attorney, Agent, or Firm* — MASCHOFF BRENNAN

(57)          ABSTRACT

Provided are a data processing method and apparatus applied to a target device in which a Linux operating system is running. A first program is deployed in the Linux operating system. The method includes: loading a target loading and invasion machine into a first memory space of the first program, and creating, in the first memory space, a second memory space for the target loading and invasion machine, where the second memory space is simply available to the target loading and invasion machine and to a program loadable by the target loading and invasion machine; configuring a second runtime environment for a second program, where the second runtime environment is isolated
(Continued)

from a first runtime environment of the first program; and loading the second program into the second memory space based on the second runtime environment, and running the second program in a threaded manner.

18 Claims, 5 Drawing Sheets

(56)                  References Cited

U.S. PATENT DOCUMENTS

2019/0102537 A1*   4/2019  Zhang ..................... G06F 21/53
2024/0394380 A1*  11/2024  Zhou ........................ G06F 21/74

FOREIGN PATENT DOCUMENTS

| | | |
|---|---|---|
| CN | 108021823  A | 5/2018 |
| CN | 113051088  A | 6/2021 |
| CN | 114595461  A | 6/2022 |
| CN | 114595462  A | 6/2022 |
| WO | 2013174503  A1 | 11/2013 |
| WO | 2018099292  A1 | 6/2018 |

OTHER PUBLICATIONS

International Search Report and Written Opinion mailed Apr. 23, 2023 in related PCT Application No. PCT/CN2023/074217, 14 pgs.

* cited by examiner

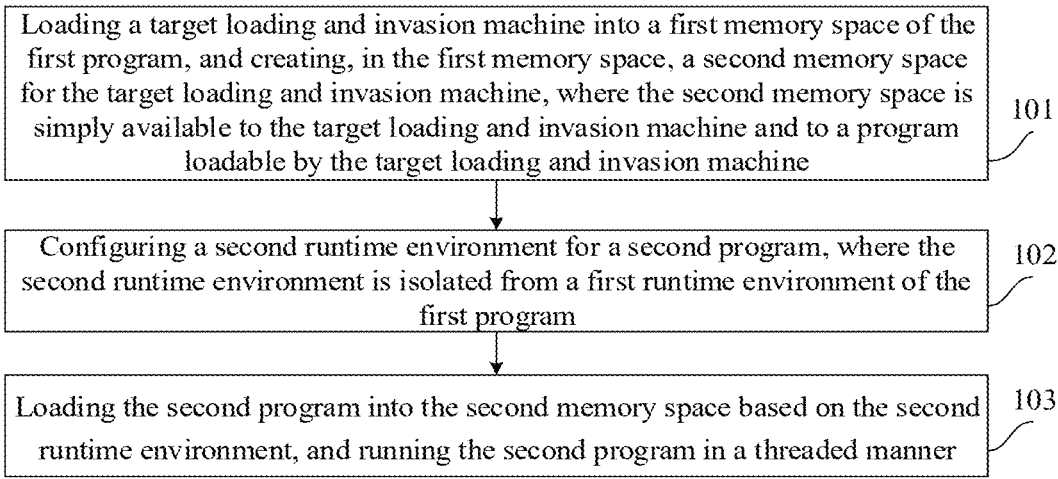

Loading a target loading and invasion machine into a first memory space of the first program, and creating, in the first memory space, a second memory space for the target loading and invasion machine, where the second memory space is simply available to the target loading and invasion machine and to a program loadable by the target loading and invasion machine          101

Configuring a second runtime environment for a second program, where the second runtime environment is isolated from a first runtime environment of the first program          102

Loading the second program into the second memory space based on the second runtime environment, and running the second program in a threaded manner          103

FIG. 1

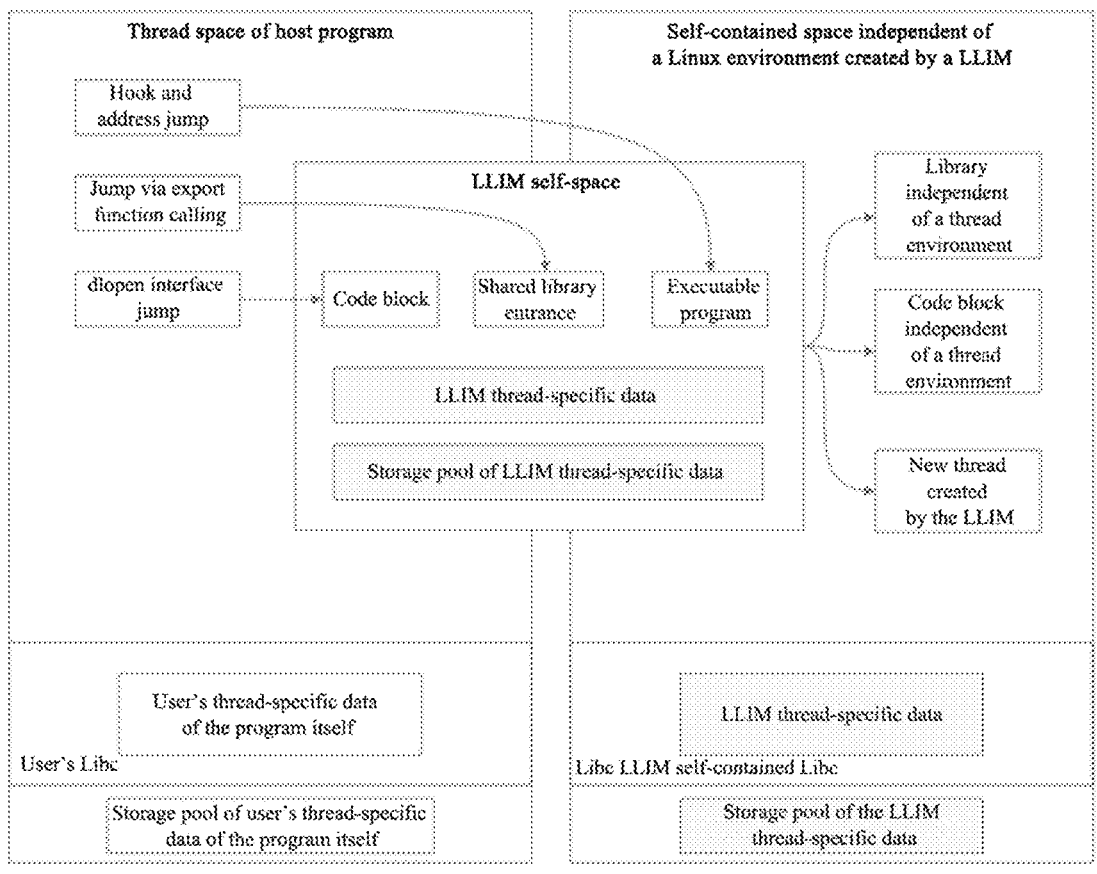

FIG. 2a

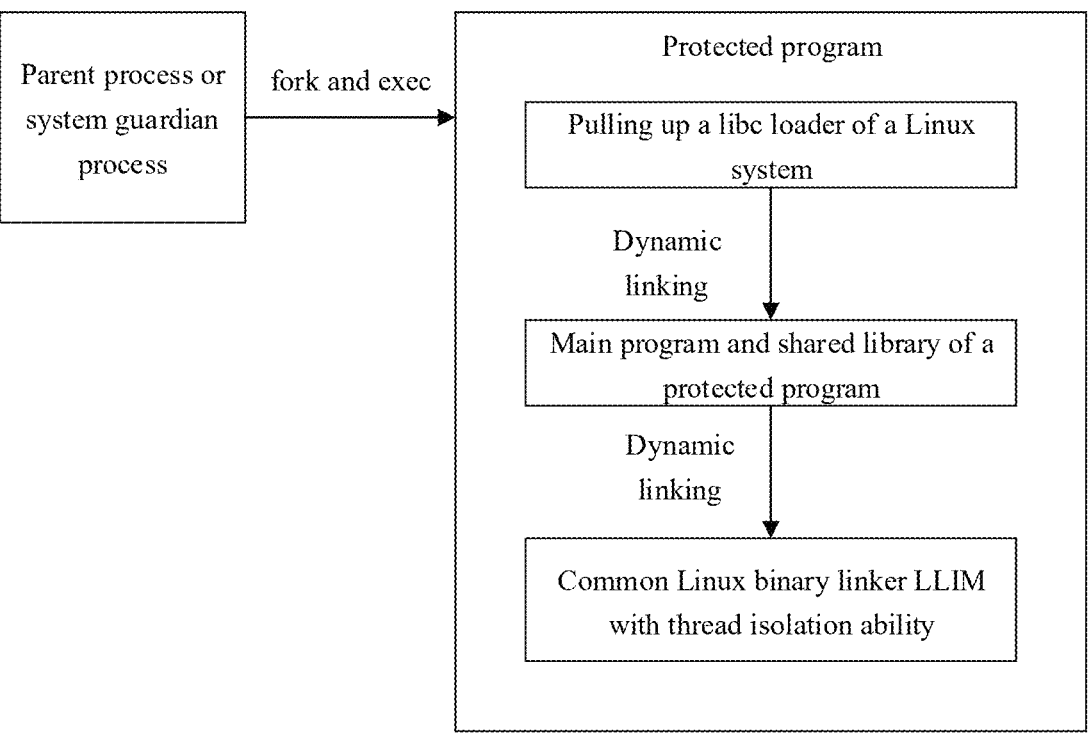

FIG. 2b

Protected program

Pulling up the libc loader of the Linux system

Dynamic loading

Main program and shared library of the protected program

Dynamic loading

Common Linux binary linker LLIM with thread isolation ability

Creating

LLIM-based self-contained and thread-isolated

LLIM loader

Initializing the following environments for execution of the security service

Basic LLIM domain libc library

Basic memory management unit

Basic thread stack

Thread-specific variable management

Virtual main thread

Thread context environment

FIG. 2c

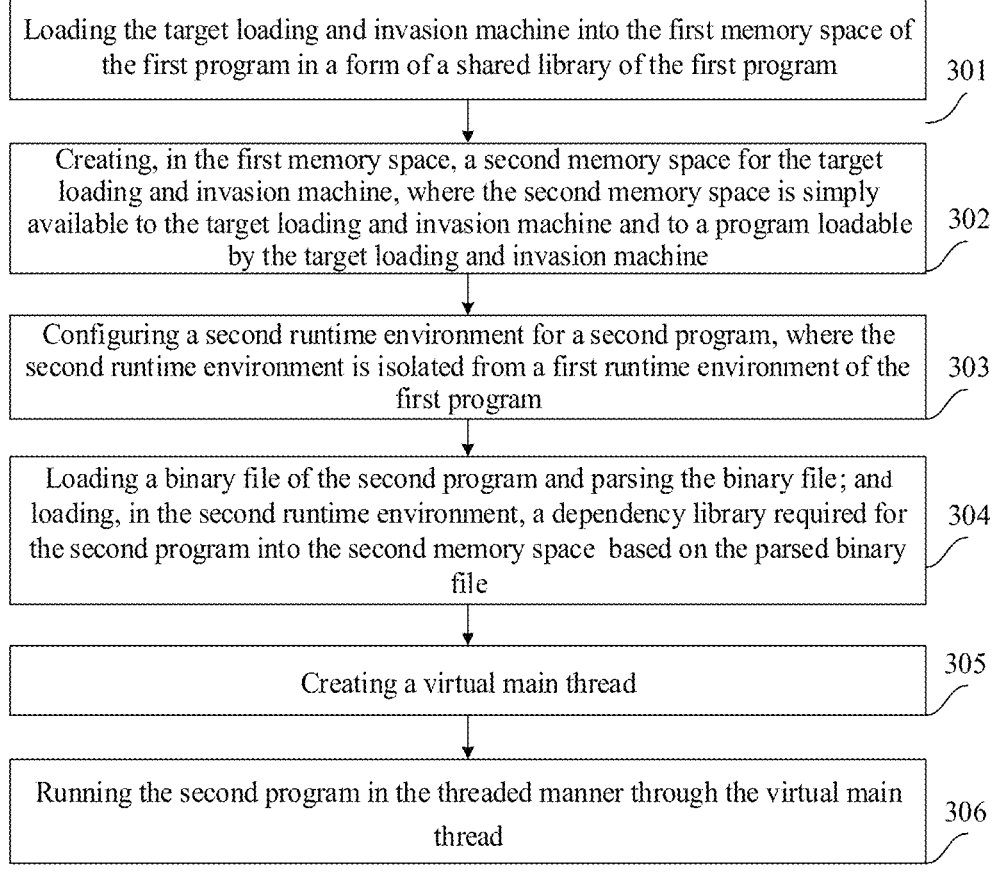

Loading the target loading and invasion machine into the first memory space of the first program in a form of a shared library of the first program    301

Creating, in the first memory space, a second memory space for the target loading and invasion machine, where the second memory space is simply available to the target loading and invasion machine and to a program loadable by the target loading and invasion machine    302

Configuring a second runtime environment for a second program, where the second runtime environment is isolated from a first runtime environment of the first program    303

Loading a binary file of the second program and parsing the binary file; and loading, in the second runtime environment, a dependency library required for the second program into the second memory space based on the parsed binary file    304

Creating a virtual main thread    305

Running the second program in the threaded manner through the virtual main thread    306

FIG. 3

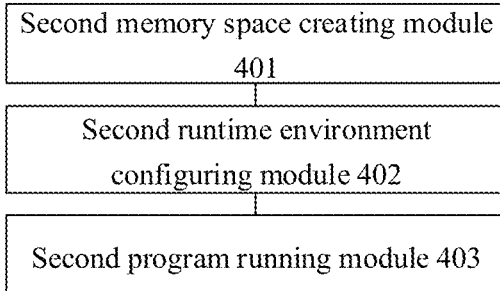

Second memory space creating module 401

Second runtime environment configuring module 402

Second program running module 403

FIG. 4

DATA PROCESSING METHOD AND APPARATUS

CROSS-REFERENCE TO RELATED APPLICATIONS

This application is a National Stage of International Application No. PCT/CN2023/074217, and filed on Feb. 2, 2023, which claims priority to Chinese Patent Application No. 202210139166.6, filed with the China National Intellectual Property Administration on Feb. 15, 2022 and entitled "Data Processing Method and Apparatus". The disclosures of the aforementioned applications are hereby incorporated by reference in their entireties.

TECHNICAL FIELD

The present disclosure relates to the field of computer technologies and, in particular, to a data processing method and apparatus.

BACKGROUND

With the development of science and technology, there is an increasing demand for smart devices in the fields such as smart home, smart security, and smart industry. The number of smart devices for accessing, such as Internet of Things devices, has grown rapidly in recent years, which has surpassed the increasing rate of mobile devices.

Correspondingly, a significant number of smart devices have increasingly prominent problems in terms of security and others. For example, it is necessary to apply APT (Advanced Persistent Threat, directional threat) protection and 24 H whole-process monitoring to a device accessing a network, and in order to solve the problems, implantation of security programs is generally needed in the device.

However, these smart terminals adopt a wide variety of operating systems. Simply for the Linux operating system, its distributions have expanded from several in the traditional IT security field to dozens or even hundreds. Due to the diversity of the distributions, the traditional solution of compiling and integrating security services and other programs struggles to meet the demand.

SUMMARY

In view of the aforementioned problem, a data processing method and apparatus are proposed for overcoming the aforementioned problem or at least partially addressing the aforementioned problem.

The data processing method is applied to a target device in which a Linux operating system is running, where a first program is deployed in the Linux operating system, and the method includes:

loading a target loading and invasion machine into a first memory space of the first program, and creating, in the first memory space, a second memory space for the target loading and invasion machine, where the second memory space is simply available to the target loading and invasion machine and to a program loadable by the target loading and invasion machine;

configuring a second runtime environment for a second program, where the second runtime environment is isolated from a first runtime environment of the first program; and loading the second program into the second memory space based on the second runtime environment, and running the second program in a threaded manner.

In an implementation, the running the second program in the threaded manner includes:

creating a virtual main thread; and running the second program in the threaded manner through the virtual main thread.

In an implementation, the method further includes:

acquiring a real-time running situation of the first program; and performing running control on the second program based on the running situation.

In an implementation, the second program is a security service program, and the second program is used to invade the first program and provide a security service for the first program.

In an implementation, the loading the target loading and invasion machine into the first memory space of the first program includes:

loading the target loading and invasion machine into the first memory space of the first program in a form of a shared library of the first program.

In an implementation, the loading the second program into the second memory space based on the second runtime environment includes:

loading a binary file of the second program and parsing the binary file; and loading, in the second runtime environment, a dependency library required for the second program into the second memory space based on the parsed binary file.

In an implementation, the target device is an Internet of Things device, and the first program is a user mode program.

The data processing apparatus is applied to a target device in which a Linux operating system is running, where a first program is deployed in the Linux operating system, and the apparatus includes:

a second memory space creating module, configured to load a target loading and invasion machine into a first memory space of the first program, and create, in the first memory space, a second memory space for the target loading and invasion machine, where the second memory space is simply available to the target loading and invasion machine and to a program loadable by the target loading and invasion machine;

a second runtime environment configuring module, configured to configure a second runtime environment for a second program, where the second runtime environment is isolated from a first runtime environment of the first program; and a second program running module, configured to load the second program into the second memory space based on the second runtime environment, and run the second program in a threaded manner.

An electronic device includes a processor, a memory, and a computer program stored in the memory and capable of running on the processor, where the computer program, when executed by the processor, implements the data processing method as described above.

A computer-readable storage medium store a computer program, where the computer program, when executed by a processor, implements the data processing method as described above.

Embodiments of the present disclosure have the following advantages.

In the embodiments of the present disclosure, program implantation based on a thread isolation technology is achieved by means of: loading a target loading and invasion machine into a first memory space of a first program deployed in a Linux operating system, and creating, in the first memory space, a second memory space for the target loading and invasion machine; then configuring, for a second program, a second runtime environment isolated from a first runtime environment of the first program; and loading the second program into the second memory space based on the second runtime environment, and running the second program in a threaded manner. The present disclosure is applicable to different Linux distributions for program implantation across Linux distributions, and only one compilation is required. Therefore, the compilation of a different set of binary codes for each Linux distribution is avoided, and the difficulty of the program implantation is reduced.

BRIEF DESCRIPTION OF DRAWINGS

In order to describe technical solutions in the present disclosure more clearly, the drawings used in the description of the present disclosure will be briefly described hereunder. Apparently, the drawings in the following description are intended for some embodiments of present disclosure. For persons of ordinary skill in the art, other drawings may be obtained based on these drawings without any creative effort.

FIG. 1 is a flowchart of steps of a data processing method according to an embodiment of the present disclosure.

FIG. 2*a* is a schematic diagram of internal running of a program according to an embodiment of the present disclosure.

FIG. 2*b* is a schematic diagram of internal running of another program according to an embodiment of the present disclosure.

FIG. 2*c* is a schematic diagram of internal running of another program according to an embodiment of the present disclosure.

FIG. 3 is a flowchart of steps of another data processing method according to an embodiment of the present disclosure.

FIG. 4 is a structural block diagram of a data processing apparatus according to an embodiment of the present disclosure.

DESCRIPTION OF EMBODIMENTS

Figure 2D:
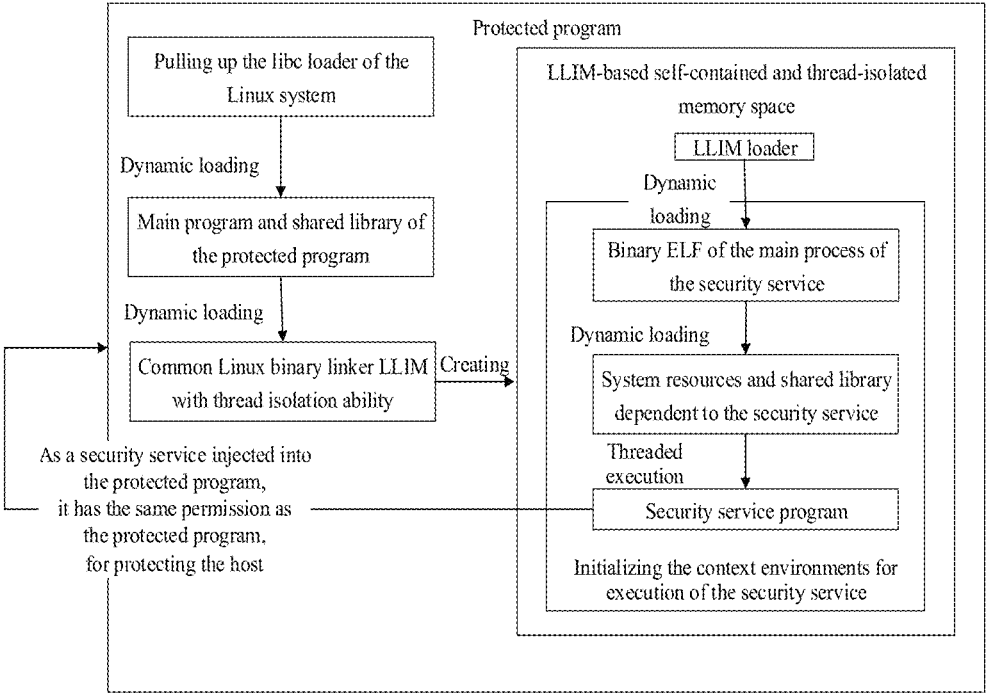
FIG. 2*d* is a schematic diagram of internal running of another program according to an embodiment of the present disclosure.

In order to make the aforementioned objectives, characteristics and advantages of the present disclosure more evident and comprehensible, the present disclosure will be described hereunder in further details in conjunction with the drawings and the implementations. Apparently, the described embodiments are only some embodiments of the present disclosure, rather than all embodiments of the present disclosure. All other embodiments obtained by persons of ordinary skill in the art based on the embodiments of the present disclosure without any creative effort shall fall into the protection scope of the present disclosure.

In an embodiment of the present disclosure, on the basis of construction of Linux thread isolation, any Linux binary application (process) can be run in another program in a threaded manner, and then can be widely used in the field of Linux binary security. A method for enabling a security service program to run directly and non-perceptually in a protected Linux program body without any transformation to source codes can be generally applied to a scenario where there are a wide variety of Linux distributions for Internet of Things devices.

Reference is made to FIG. 1, FIG. 1 shows a flowchart of steps of a data processing method according to an embodiment of the present disclosure. The method can be applied to a target device in which a Linux operating system is running. The target device may be an Internet of Things device. The Linux operating system may be deployed with a first program, that is, a host program. Compared with a security service program, the first program is a protected program.

The first program may be a user application running in a Linux operating system, or may be a command line tool, or may be a service-level application service or a program running based on a container environment, that is, it is a user-mode program. Programs in a Linux operating system are divided into a kernel mode program and a user mode program. The kernel mode program is maintained by a team of a Linux open source, to provide encapsulation of hardware for a lower computer layer and provide a unified system call interface for the user mode program, achieving differential shielding for hardware, a network and a file system. The user mode program refers to an application program developed by a developer based on a Linux kernel, such as a browser, communication software, picture processing software, and photographing software.

Specifically, the following steps may be included.

Step 101, loading a target loading and invasion machine into a first memory space of the first program, and creating, in the first memory space, a second memory space for the target loading and invasion machine, where the second memory space is simply available to the target loading and invasion machine and to a program loadable by the target loading and invasion machine.

In an embodiment of the present disclosure, the loading the target loading and invasion machine into the first memory space of the first program may include: loading the target loading and invasion machine into the first memory space of the first program in a form of a shared library of the first program.

The target loading and invasion machine (LLIM, Linux Loading and Invasion Machine) may be a binary dynamic loader, which is a shared library that is loadable with the loading of a program in an operating system, and which may have two functions:

On the one hand, as an ordinary shared library independent of the binary link location, the LLIM may be loaded into a memory space of the program (namely, the first memory space) by the loader of the operating system.

On the other hand, the LLIM may be a loader having a self-contained space (namely, the second memory space) and a thread isolation mechanism in itself, through which other programs, such as a security service program, may be loaded. Moreover, the other programs are running in a process space of the host program (namely, the first program) in a threaded manner.

Inside the LLIM, a "thread isolation" mechanism can be provided, to ensure that the LLIM itself and other ELF shared libraries loaded by the LLIM are in the memory, and in the continuation and the execution flow of the host program, but the thread context thereof is completely independent. That is, when the executable codes run in the LLIM body or a memory code range of the binary library into which the executable codes are loaded, resources such as the thread stack, the private variable, and the lock are independent and autonomous, thereby ensuring that the LLIM and all ELFs loaded by the LLIM can run in any Linux host environment.

As shown in FIG. 2a, besides the thread-specific data and storage pools of the thread-specific data in the user's Libc of the host program and the LLIM self-contained Libc, a self-contained space (namely, the second memory space) isolated from the thread space of the host program can be created through the thread isolation mechanism.

The thread space of the host program may be jumped to an executable program, a shared library entrance, and a code block in the LLIM self-space by means of Hook and address jump, jump via export function calling, dlopen interface jump, etc. The self-contained space, independent of the Linux environment, created by the LLIM may have a library independent of the thread environment, a code block independent of the thread environment, and a new thread created by the LLIM.

Before the running of the first program, the Linux operating system would be responsible for loading a shared library as required for the first program, the LLIM can be loaded into the process space of the first program in a form of the shared library.

As shown in FIG. 2b, the first program acting as a protected program can be triggered by a parent process or a system guardian process by calling a fork ( ) function and an exec ( ) function, pulling up the libc Loader (loader) of the Linux operating system, and then performing a dynamic link to a main program and a shared library of the protected program, and then carrying out a dynamic connection to a common Linux binary linker LLIM with thread isolation ability.

For the LLIM, it is possible to create, in the first memory space, a second memory space for the LLIM. The second memory space is simply available to the LLIM and to a program loadable by the LLIM, which is the self-contained space of the LLIM. The self-contained space is a namespace created by the Linux process loader to conform to the link of its own libc library, and in this space, the loader only loads, for the application program, a shared library file under a specific directory.

Step 102, configuring a second runtime environment for a second program, where the second runtime environment is isolated from a first runtime environment of the first program.

The second program may be a security service program, and the second program can be configured to invade the first program and provide security services thereto, such as security invasion detection, vulnerability scanning, persistent defense and other services.

In the second memory space, a second runtime environment isolated from the first runtime environment of the first program can be configured for a second program that is about to be loaded and executed through loading a program, which may include linking to a shared library, initializing thread context, starting a thread, etc., Initializing the thread context may include initialization of stacks, thread-specific variables, device and memory management, and others.

As shown in FIG. 2c, the common Linux binary linker LLIM with thread isolation ability can create a LLIM-based self-contained and thread-isolated memory space, that is, the second memory space. Then, environments for execution of a security service can be initialized by the LLIM loader, that is, the second runtime environment, for example, it may include a basic LLIM domain libc library, a basic memory management unit, a basic thread stack, a thread-specific variable management, a virtual main thread, a thread context environment, and the like.

Step 103, loading the second program into the second memory space based on the second runtime environment, and running the second program in a threaded manner.

In an embodiment of the present disclosure, the loading the second program into the second memory space based on the second runtime environment includes: loading a binary file of the second program and parsing the binary file; and loading, in the second runtime environment, a dependency library required for the second program into the second memory space based on the parsed binary file.

In an embodiment of the present disclosure, the running the second program in the threaded manner may include:

creating a virtual main thread; and running the second program in the threaded manner through the virtual main thread.

In a specific implementation, the LLIM may load a binary file of the second program such as an ELF (Executable and Linking Format, executable and linkable format) file into the memory, and may parse the file. After it is parsed, a dependency library required for the second program can be loaded, in an independent thread context, into the self-contained space, namely, the second memory space.

In the domain of the Linux user mode program, an execution start of any process can be generalized as a starting point of a "main thread", and the main thread plays the roles of controlling the lifecycle of the program itself, incubating, controlling and recycling other child work threads, and managing resources used by the process such as stacks, piles, devices and files.

However, in an embodiment of the present disclosure, the LLIM may perform threading for the loaded second program, and within the body of the first program, initialize for the second program a thread space structurally isolated from the main thread of the protected program and running independently, and initialize the same into an independent virtual main thread for use by the second program, to achieve the effect of enabling the second program to run in the body of the protected program in a posture of an independent "thread group", so that the security service program can be detected without barriers and the protected program can be protected.

Specifically, after the second program is loaded, a start (namely, a start of a main function) entrance can be found therefrom, then a virtual main thread can be created to start execution of an instruction at an entrance address of the main function, to invoke the entire second program, so that the second program is running in the threaded manner.

As shown in FIG. 2d, after initializing the context environment for execution by the security service, the LLIM loader can execute the security service program in the threaded manner by dynamically loading a binary ELF of the main process of the security service and dynamically loading system resources and a shared library dependent to the security service, and use the security service program as a security service injected into the protected program, where it may have the same permission as the protected program, for protecting the host.

The second program of the security service program is loaded into the protected program by the LLIM, so that operations such as binary invasion, file system monitoring, file system scanning and kernel event monitoring can be performed, thereby achieving the objective of detecting and protecting the protected program.

It should be noted that, for a second program to be loaded by the LLIM, one-time compilation and construction may be performed by using the libc shared library system adopted by the LLIM, to generate the second program, appended with a shared library, a profile and the like required for the second program.

In an embodiment of the present disclosure, the method may further include: acquiring a real-time running situation of the first program; and performing running control on the second program based on the running situation.

During the running process of the first program, the LLIM can monitor the running situation of the first program, identify states such as running, suspending, recovering and terminating in a lifecycle thereof, and then perform lifecycle control such as suspending, recovering and terminating in response to the second program, to prevent a memory leakage or an abnormal crash.

Figure 2E:
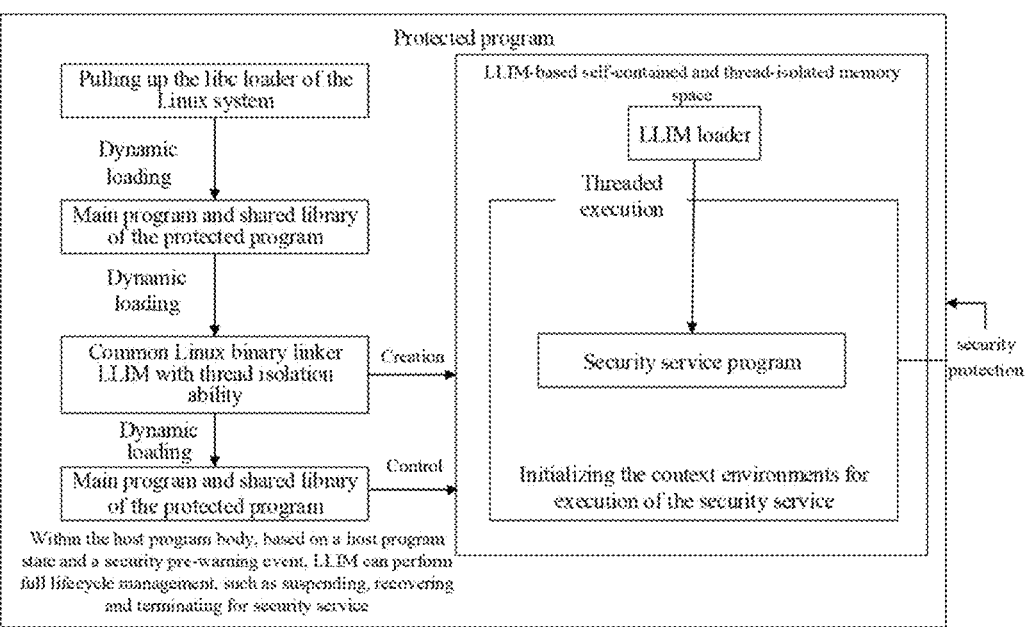
FIG. 2*e* is a schematic diagram of internal running of another program according to an embodiment of the present disclosure.

As shown in FIG. 2e, after the security service program is executed in the threaded manner, security protection can be provided, and within the host program body, based on a host program state and a security pre-warning event, full lifecycle management, such as suspending, recovering and terminating, can be performed for the security service.

Figure 2F:
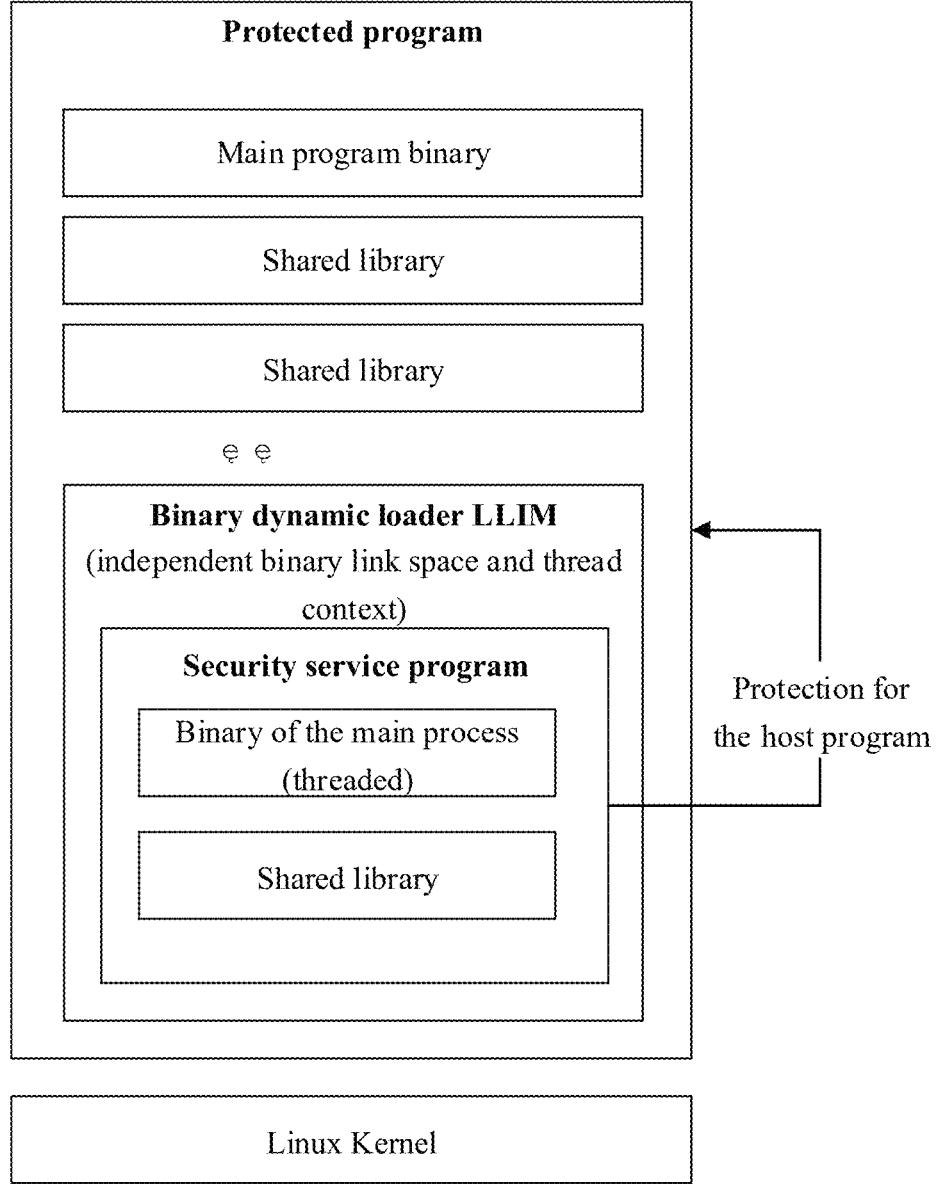
FIG. 2*f* is a schematic diagram of internal running of another program according to an embodiment of the present disclosure.

In general, as shown in FIG. 2f, on the basis of the Linux Kernel, the protected program may be loaded with a main program binary, a shared library and a binary dynamic loader LLIM. The binary dynamic loader LLIM can create an independent binary link space and thread context, and then load a security service program therein. Specifically, the shared library can be loaded and the main program binary can be executed in the threaded manner, thus it is capable of protecting the protected host program.

In the embodiments of the present disclosure, program implantation based on a thread isolation technology is achieved by means of: loading a target loading and invasion machine into a first memory space of a first program deployed in a Linux operating system, and creating, in the first memory space, a second memory space for the target loading and invasion machine; then configuring, for a second program, a second runtime environment isolated from a first runtime environment of the first program; and loading the second program into the second memory space based on the second runtime environment, and running the second program in a threaded manner. The present disclosure is applicable to different Linux distributions for program implantation across Linux distributions, and only one compilation is required. Therefore, the compilation of a different set of binary codes for each Linux distribution is avoided, and the difficulty of the program implantation is reduced.

Reference is made to FIG. 3, FIG. 3 shows a flowchart of steps of another data processing method according to an embodiment of the present disclosure. Specifically, the following steps may be included.

Step 301, loading the target loading and invasion machine into the first memory space of the first program in a form of a shared library of the first program.

On the one hand, as an ordinary shared library independent of the binary link location, the LLIM can be loaded into the memory space of the program (namely, the first memory space) by the loader of the operating system.

Before the running of the first program, the Linux operating system would be responsible for loading a shared library as required for the first program, the LLIM can be loaded into the process space of the first program in a form of the shared library.

Step 302, creating, in the first memory space, a second memory space for the target loading and invasion machine, where the second memory space is simply available to the target loading and invasion machine and to a program loadable by the target loading and invasion machine.

On the other hand, the LLIM may be a loader having a self-contained space (namely, the second memory space) and a thread isolation mechanism in itself, through which other programs, such as a security service program, may be loaded. Moreover, the other programs are running in a process space of the host program (namely, the first program) in a threaded manner.

For the LLIM, it is possible to create, in the first memory space, a second memory space for the LLIM. The second memory space is simply available to the LLIM and to a program loadable by the LLIM, that is, the self-contained space of the LLIM. The self-contained space is a namespace created by the Linux process loader to conform to the link of its own libc library, and in this space, the loader only loads, for the application program, a shared library file under a specific directory.

Inside the LLIM, a "thread isolation" mechanism can be provided, to ensure that the LLIM itself and other ELF shared libraries loaded by the LLIM are in the memory, and continued in the execution flow of the host program, but the thread context thereof is completely independent. That is, when the executable codes run in the LLIM body or a memory code range of the binary library into which the executable codes are loaded, resources such as the thread stack, the specific variable, and the lock are independent and autonomous, thereby ensuring that the LLIM and all ELFs loaded by the LLIM can run in any Linux host environment.

Step 303, configuring a second runtime environment for a second program, where the second runtime environment is isolated from a first runtime environment of the first program.

The second program may be a security service program, and the second program can be configured to invade the first program and provide security services thereto, such as security invasion detection, vulnerability scanning, persistent defense and other services.

In the second memory space, a second runtime environment isolated from the first runtime environment of the first program can be configured for a second program that is about to be loaded and executed through loading a program, which may include linking to a shared library, initializing thread context, starting a thread, etc., Initializing the thread context may include initialization of stacks, thread-specific variables, device and memory management, and others. Step 304, loading a binary file of the second program and parsing the binary file.

In a specific implementation, the LLIM can load a binary file of the second program into the memory, such as an ELF file, and can parse the file.

Step 304, loading, in the second runtime environment, a dependency library required for the second program into the second memory space based on the parsed binary file.

After it is parsed, a dependency library required for the second program can be loaded, in an independent thread context, into the self-contained space, namely, the second memory space.

Step 305, creating a virtual main thread.

Step 306, running the second program in the threaded manner through the virtual main thread.

In the domain of the Linux user mode program, an execution start of any process can be generalized as a starting point of a "main thread", and the main thread plays the roles of controlling the lifecycle of the program itself, incubating, controlling and recycling other child work threads, and managing resources used by the process such as stacks, piles, devices and files.

However, in an embodiment of the present disclosure, the LLIM may perform threading for the loaded second program, and within the body of the first program, initialize for the second program a thread space structurally isolated from the main thread of the protected program and running independently, and initialize the same into an independent virtual main thread for use by the second program, to achieve the effect of enabling the second program to run in the body of the protected program in a posture of an independent "thread group", so that the security service program can be detected without barriers and the protected program can be protected.

Specifically, after the second program is loaded, a start (namely, a start of a main function) entrance can be found therefrom, then a virtual main thread can be created to start execution of an instruction at an entrance address of the main function, to invoke the entire second program, so that the second program is running in the threaded manner.

Specifically, compared with a native compilation mode of the traditional IT security service in a relatively fixed environment of an operating system with a server, a mobile device and others, or a cross-system adaptation running mode that has not been solved in the Internet of Things industry at present, the embodiments of the present disclosure have the following obvious advantages.

1. Base technologies: thread isolation and self-containment, are utilized, so that the security service program can be compiled in one shot and run across all Internet of Things Linux platforms.

2. In light of the characteristic of the existing service program over the Internet of Things that transformation and upgrading thereof is difficult, a security service program can be injected non-perceptually through the pre-loading ability carried by the system itself without any modification to the existing service program, so that the running of the service program has security protection.

3. The invasion is relatively negligible, and the native program goes through a process-level protection in the binary field, so that the operation efficiency of the overall system of the equipment would not be affected, thus it is capable of achieving accurate detection and precise protection.

It should be noted that, for brevity of description, the method embodiments are described as a series of action combinations. However, persons skilled in the art should know that the embodiments of the present disclosure are not limited by the sequence of actions as described, since, according to the embodiments of the present disclosure, some steps may be performed in another sequence or simultaneously. Next, those skilled in the art should also know that the embodiments described in the description are preferred embodiments, and the involved actions are not necessarily required in the embodiments of the present disclosure.

Reference is made to FIG. 4, FIG. 4 shows a schematic structural diagram of a data processing apparatus according to an embodiment of the present disclosure. The apparatus is applied to a target device in which a Linux operating system is running, where a first program is deployed in the Linux operating system, and the apparatus may specifically include the following modules:

a second memory space creating module 401, configured to load a target loading and invasion machine into a first memory space of the first program; and create, in the first memory space, a second memory space for the target loading and invasion machine, where the second memory space is simply available to the target loading and invasion machine and to a program loadable by the target loading and invasion machine;

a second runtime environment configuring module 402, configured to configure a second runtime environment for a second program, where the second runtime environment is isolated from a first runtime environment of the first program; and a second program running module 403, configured to load the second program into the second memory space based on the second runtime environment, and run the second program in a threaded manner.

In an embodiment of the present disclosure, the second program running module 403 may include:

a virtual main thread creating sub-module, configured to create a virtual main thread; and a second program running via the virtual main threading sub-module, configured to run the second program in the threaded manner through the virtual main thread.

In an embodiment of the present disclosure, the apparatus further includes:

a real-time running situation acquiring module, configured to acquire a real-time running situation of the first program; and a running control module, configured to perform running control on the second program based on the running situation.

In an embodiment of the present disclosure, the second program is a security service program, and the second program is used to invade the first program and provide a security service therefor.

In an embodiment of the present disclosure, the second memory space creating module 401 is further configured to:

load the target loading and invasion machine into the first memory space of the first program in a form of a shared library of the first program.

In an embodiment of the present disclosure, the second memory space creating module 401 may include:

a binary file loading and parsing sub-module, configured to load a binary file of the second program and parsing the binary file; and a dependency library loading sub-module, configured to load, in the second runtime environment, the dependency library required into the second memory space a dependency library required for the second program into the second memory space based on the parsed binary file.

In an embodiment of the present disclosure, the target device is an Internet of Things device, and the first program is a user mode program.

An embodiment of the present disclosure further provides an electronic device which may include a processor, a memory, and a computer program stored on the memory and capable of running on the processor, where the computer program, when executed by the processor, implements the data processing method as described above.

An embodiment of the present disclosure further provides a computer-readable storage medium having a computer program stored thereon, where the computer program, when executed by a processor, implements the data processing method as described above.

For the apparatus embodiments, since they are basically similar to the method embodiments, the description thereof is relatively simple. Reference can be made to partial description of the method embodiments for relevant parts.

The respective embodiments are described in the specification progressively, and each embodiment focuses on differences from other embodiments. For the same or similar part between the embodiments, reference may be made to each other.

Those skilled in the art should understand that the embodiments of the present disclosure can be provided as a method, an apparatus, or a computer program product. Therefore, the embodiments of the present disclosure can adopt the form of a complete hardware embodiment, a complete software embodiment, or a combination of software and hardware embodiments. Moreover, the embodiments of the present disclosure can adopt the form of a computer program product implemented on one or more computer-usable storage media (including but not limited to a magnetic disk memory, a CD-ROM, an optical memory and the like) containing computer-usable program codes therein.

The embodiments of the present disclosure are described with reference to flow charts and/or block diagrams of methods, terminal devices (systems) and computer program products according to the embodiments of the present disclosure. It will be appreciated that computer program instructions can implement each flow and/or block in the flow charts and/or the block diagrams, and a combination of a flow and/or a block in the flow charts and/or the block diagrams. These computer program instructions may be provided to a processor of a general purpose computer, a special purpose computer, an embedded processor or other programmable data processing terminal devices to generate a machine, so that instructions executed by the processor of the computers or other programmable data processing terminal devices generate a device for implementing functions specified in one or more flows of the flow charts and/or one or more blocks of the block diagrams.

These processor program instructions may also be stored in a computer-readable memory capable of directing the computers or other programmable data processing terminal devices to operate in a specific manner, so that instructions stored in the computer-readable memory generate a manufactured product including an instruction device, where the instruction device implements functions specified in one or more flows of the flow charts and/or one or more blocks of the block diagrams.

These computer program instructions may also be loaded in the computers or other programmable data processing terminal devices, so that a series of operation steps are performed in the computers or other programmable terminal devices to generate a computer-implemented process, and thus the instructions executed on the computers or other programmable devices provide steps for implementing the functions specified in one or more flows of the flow charts and/or one or more blocks of the block diagrams.

Although preferred embodiments of the present disclosure have been described, those skilled in the art can make additional variations and modifications to these embodiments once getting knowledge of basic inventive concepts. Thus, the appended claims are intended to be interpreted as including the preferred embodiments and all variations and modifications falling into the scope of the embodiments of the present disclosure.

Finally, it should also be noted that relational terms herein, such as first, second and the like, are used solely to distinguish one entity or operation from another entity or operation, but do not necessarily require or imply that those entities or operations have any such actual relationship or sequence therebetween. Further, the term "include", "contain" or any other variation thereof is intended to cover non-exclusive inclusion, so that a process, a method, an article or a terminal device including a series of elements not only includes those elements, but also includes other elements that are non-explicitly listed or elements that are inherent to such process, method, article or terminal device. In the absence of further restrictions, an element defined by the phrase "including a . . . " does not preclude the existence of other identical elements in the process, the method, the article or the terminal device including the element.

The data processing method and apparatus as provided have been described above in details. The principles and embodiments of the present disclosure are elaborated herein with specific examples, and the description of the foregoing embodiments is only used to facilitate understanding the method and the core idea of the present disclosure. Meanwhile, persons of ordinary skill in the art can make modifications to the embodiments and the application scope based on the idea of the present disclosure. In conclusion, the content of the specification shall not be construed as a limitation to the present disclosure.

The invention claimed is:

1. A data processing method, applied to a target device in which a Linux operating system is running, wherein a first program is deployed in the Linux operating system, and the method comprises:

loading a target loading and invasion machine into a first memory space of the first program, and creating, in the first memory space, a second memory space for the target loading and invasion machine, wherein the second memory space is simply available to the target loading and invasion machine and to a program loadable by the target loading and invasion machine;

configuring a second runtime environment for a second program, wherein the second runtime environment is isolated from a first runtime environment of the first program; and loading the second program into the second memory space based on the second runtime environment, and running the second program in a threaded manner;

wherein the loading the second program into the second memory space based on the second runtime environment comprises:

loading a binary file of the second program and parsing the binary file; and loading, in the second runtime environment, a dependency library required for the second program into the second memory space based on the parsed binary file.

2. The method according to claim 1, wherein the running the second program in the threaded manner comprises:

creating a virtual main thread; and running the second program in the threaded manner through the virtual main thread.

3. The method according to claim 1, further comprising:

acquiring a real-time running situation of the first program; and performing running control on the second program based on the running situation.

4. The method according to claim 1, wherein the second program is a security service program, and the second program is used to invade the first program and provide a security service for the first program.

5. The method according to claim 1, wherein the loading the target loading and invasion machine into the first memory space of the first program comprises:

loading the target loading and invasion machine into the first memory space of the first program in a form of a shared library of the first program.

6. The method according to claim 1, wherein the target device is an Internet of Things device, and the first program is a user mode program.

7. A data processing apparatus, applied to a target device in which a Linux operating system is running, wherein a first program is deployed in the Linux operating system, and the apparatus comprises:

a processor;

a memory; and a computer program stored in the memory and capable of running on the processor, wherein the computer program, when executed by the processor, causes the processor to:

load a target loading and invasion machine into a first memory space of the first program, and create, in the first memory space, a second memory space for the target loading and invasion machine, wherein the second memory space is simply available to the target loading and invasion machine and to a program loadable by the target loading and invasion machine;

configure a second runtime environment for a second program, wherein the second runtime environment is isolated from a first runtime environment of the first program; and load the second program into the second memory space based on the second runtime environment, and run the second program in a threaded manner;

wherein the processor is further caused to:

load a binary file of the second program and parse the binary file; and load, in the second runtime environment, a dependency library required for the second program into the second memory space based on the parsed binary file.

8. A non-transitory computer-readable storage medium, storing a computer program, wherein the computer program, when executed by a processor, causes the processor to implement the following:

loading a target loading and invasion machine into a first memory space of a first program, and creating, in the first memory space, a second memory space for the target loading and invasion machine, wherein the second memory space is simply available to the target loading and invasion machine and to a program loadable by the target loading and invasion machine;

configuring a second runtime environment for a second program, wherein the second runtime environment is isolated from a first runtime environment of the first program; and loading the second program into the second memory space based on the second runtime environment, and running the second program in a threaded manner;

wherein the processor is further caused to implement the following:

loading a binary file of the second program and parsing the binary file; and loading, in the second runtime environment, a dependency library required for the second program into the second memory space based on the parsed binary file.

9. The apparatus according to claim 7, wherein the processor is further caused to:

create a virtual main thread; and run the second program in the threaded manner through the virtual main thread.

10. The apparatus according to claim 7, wherein the processor is further caused to:

acquire a real-time running situation of the first program; and perform running control on the second program based on the running situation.

11. The apparatus according to claim 7, wherein the second program is a security service program, and the second program is used to invade the first program and provide a security service for the first program.

12. The apparatus according to claim 7, wherein the processor is further caused to:

load the target loading and invasion machine into the first memory space of the first program in a form of a shared library of the first program.

13. The apparatus according to claim 7, wherein the target device is an Internet of Things device, and the first program is a user mode program.

14. The storage medium according to claim 8, wherein the processor is further caused to implement the following:

creating a virtual main thread; and running the second program in the threaded manner through the virtual main thread.

15. The storage medium according to claim 8, wherein the processor is further caused to implement the following:

acquiring a real-time running situation of the first program; and performing running control on the second program based on the running situation.

16. The storage medium according to claim 8, wherein the second program is a security service program, and the second program is used to invade the first program and provide a security service for the first program.

17. The storage medium according to claim 8, wherein the processor is further caused to implement the following:

loading the target loading and invasion machine into the first memory space of the first program in a form of a shared library of the first program.

18. The storage medium according to claim 8, wherein a target device is an Internet of Things device, and the first program is a user mode program.

* * * * *